United States Patent
Yonezawa et al.

(10) Patent No.: US 6,829,203 B2
(45) Date of Patent: Dec. 7, 2004

(54) OPTICAL DISK APPARATUS AND OPTICAL DISK PROCESSING METHOD

(75) Inventors: Minoru Yonezawa, Musashino (JP); Hideaki Ohsawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 552 days.

(21) Appl. No.: 09/916,444

(22) Filed: Jul. 30, 2001

(65) Prior Publication Data

US 2002/0154582 A1 Oct. 24, 2002

(30) Foreign Application Priority Data

Apr. 24, 2001 (JP) ........................................ 2001-126115

(51) Int. Cl.$^7$ ............................................. G11B 7/095
(52) U.S. Cl. ............................... 369/44.27; 369/53.14; 369/53.28; 369/44.32; 369/112.24
(58) Field of Search .......................... 369/44.66, 44.27, 369/44.29, 44.32, 53.14, 53.3, 53.28, 112.24

(56) References Cited

U.S. PATENT DOCUMENTS

| | | | |
|---|---|---|---|
| 4,850,695 A | | 7/1989 | Mikuriya et al. |
| 6,097,690 A | * | 8/2000 | Mochizuki et al. ..... 369/112.24 |
| 6,314,064 B1 | * | 11/2001 | Ueda et al. ............ 369/112.24 |
| 6,400,663 B1 | * | 6/2002 | Okada et al. ............ 369/53.28 |
| 6,418,108 B1 | * | 7/2002 | Ueda et al. ............. 369/53.23 |
| 2002/0080700 A1 | | 6/2002 | Watanabe et al. |
| 2002/0093890 A1 | | 7/2002 | Iida |

FOREIGN PATENT DOCUMENTS

| | | |
|---|---|---|
| EP | 0 470 807 A1 | 2/1992 |
| EP | 0 805 439 A1 | 11/1997 |
| JP | 5-234241 | 9/1993 |
| JP | 7-65382 | 3/1995 |
| JP | 11-176073 | 7/1999 |
| JP | 11-273092 | 10/1999 |
| JP | 2000-11401 | 1/2000 |
| JP | 2000-20985 | 1/2000 |
| JP | 2000-76679 | 3/2000 |
| JP | 2000-207750 | 7/2000 |

\* cited by examiner

*Primary Examiner*—W. R. Young
*Assistant Examiner*—Jorge Leonardo Ortiz-Criado
(74) *Attorney, Agent, or Firm*—Pillsbury Winthrop LLP

(57) ABSTRACT

An optical disk apparatus has a first optical system having an objective lens with a first NA, a second optical system having an objective lens with a second NA lower than the first NA. The optical disk apparatus at the time of processing the optical disk, when the optical system suitable recording/ reproduction process of the optical disk is the second optical system, via the first optical system detecting a surface run-out of the optical disk and execute the focus lead-in process of the second optical system on the basis of a surface run-out detected; and when at the time of processing the optical disk, when the optical system suitable recording/ reproduction process of the optical disk is the first optical system, processing the optical disk with the first optical system without detecting the surface run-out of the optical disk.

2 Claims, 13 Drawing Sheets

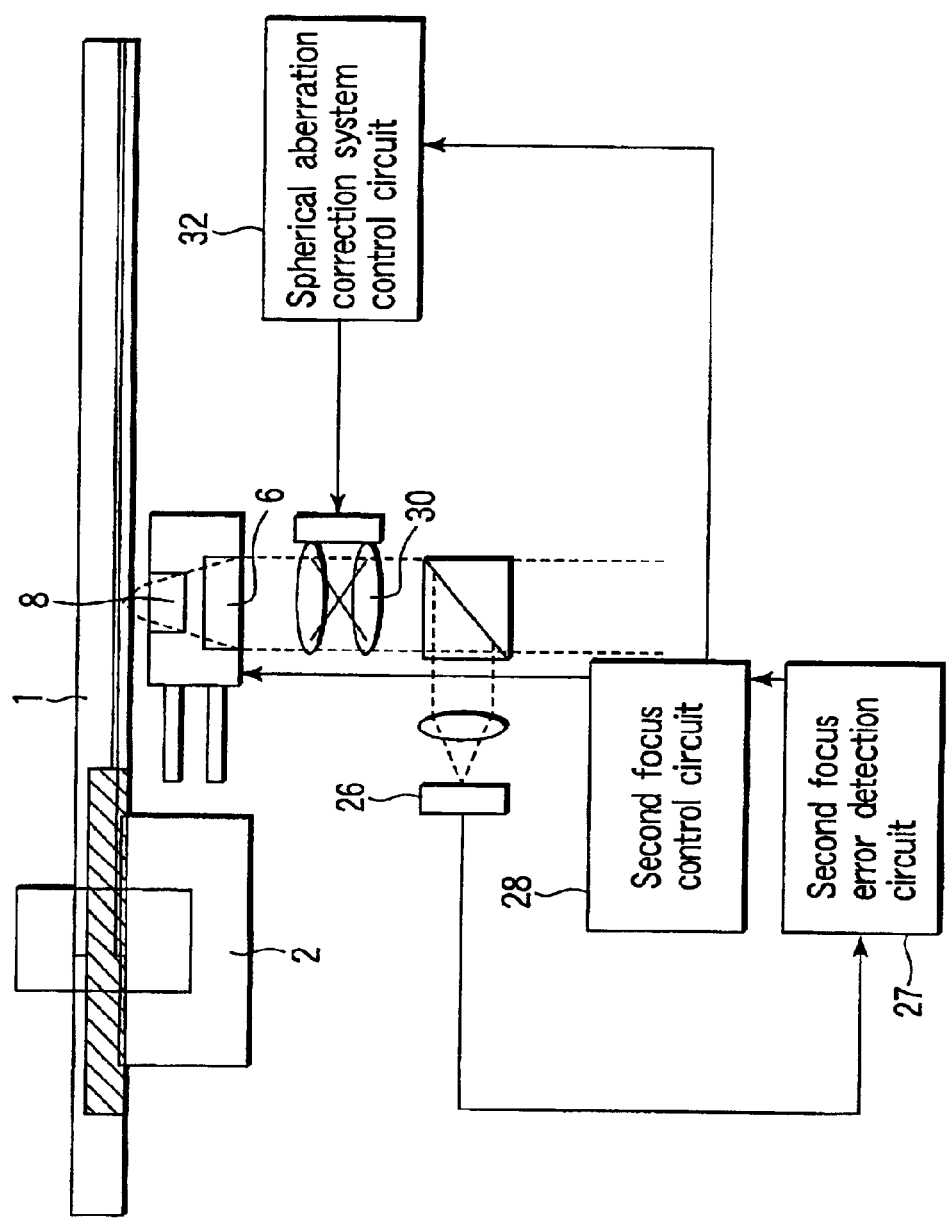
F I G. 7

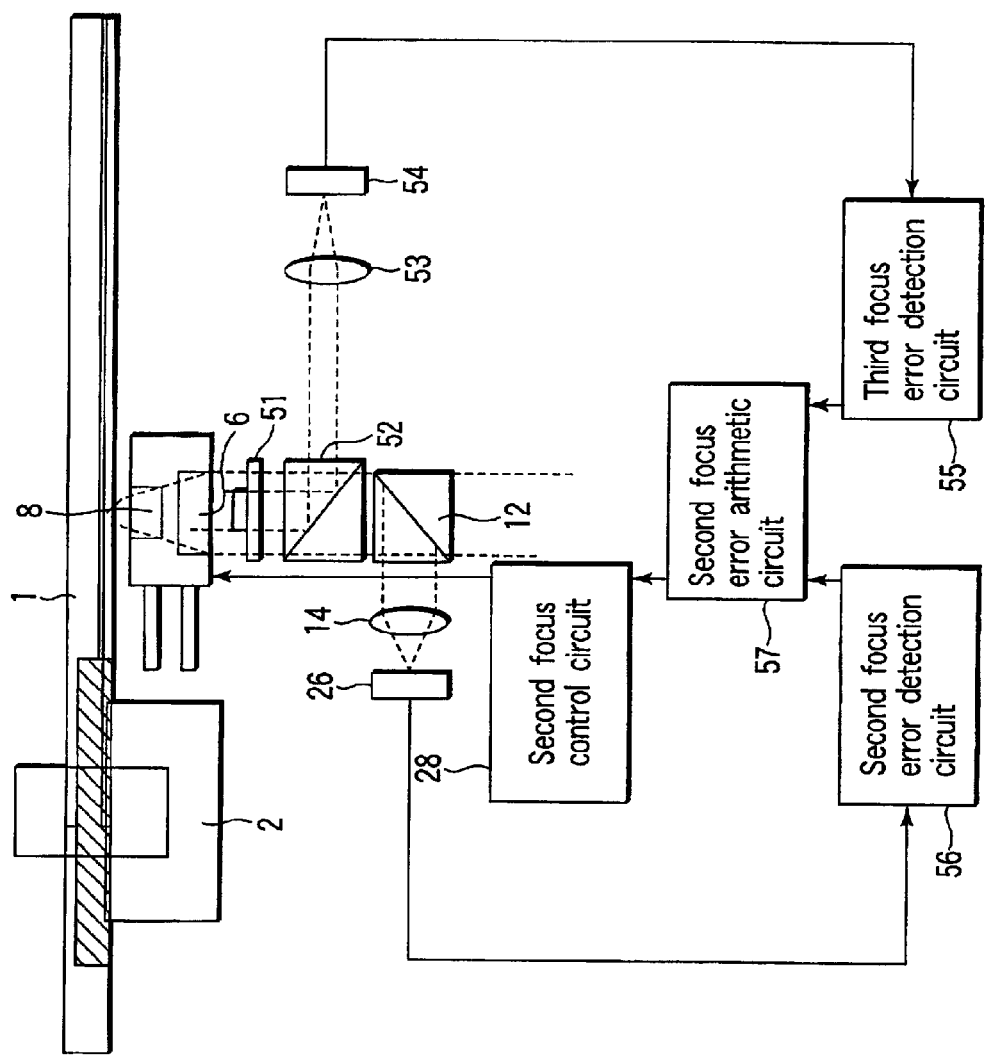
F I G. 8

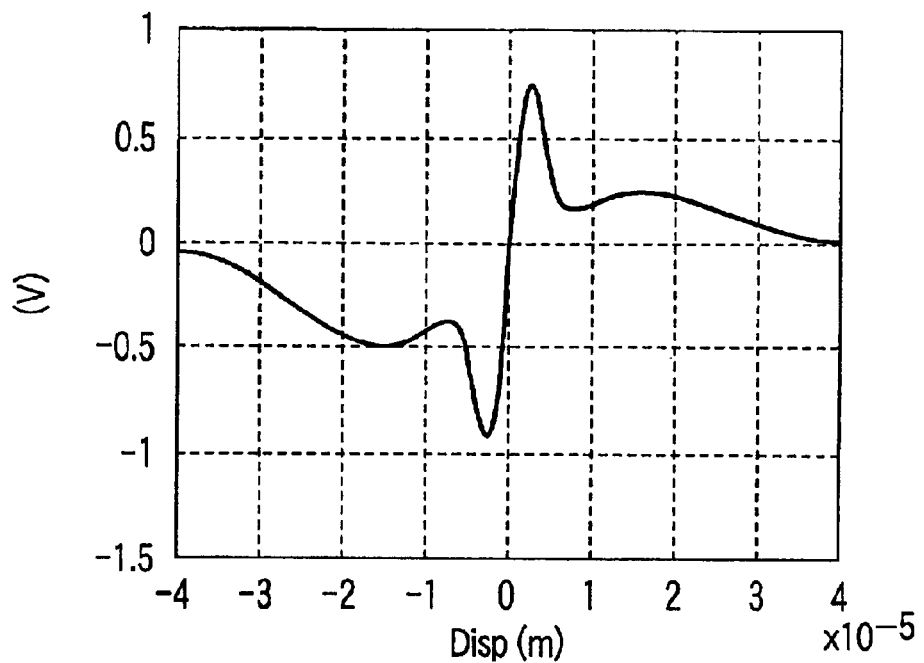
F I G. 11
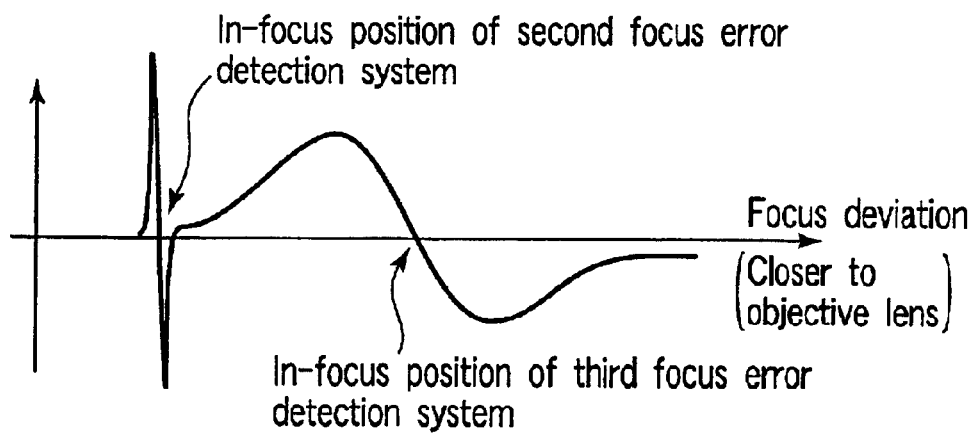
F I G. 12

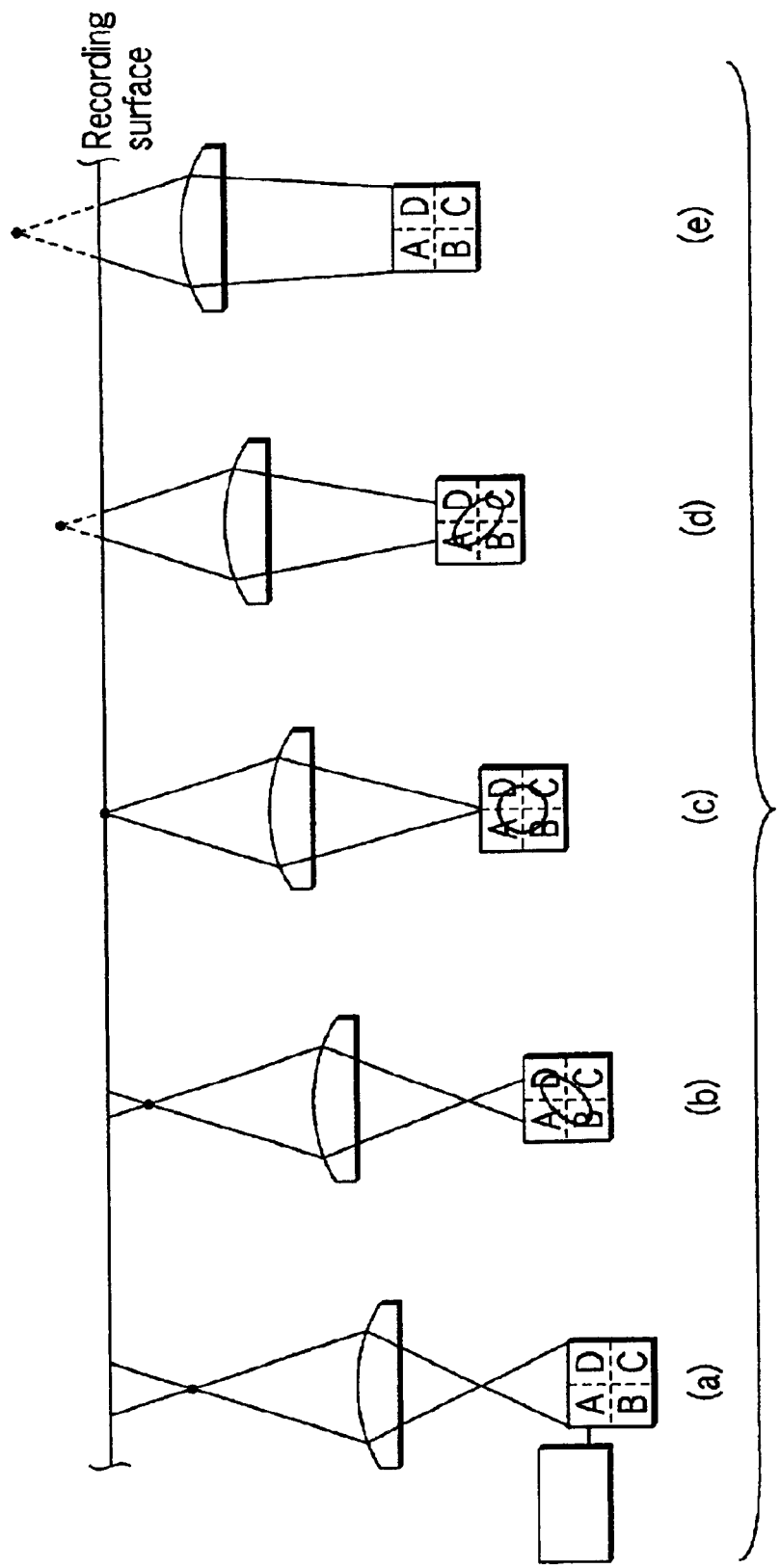
F I G. 13

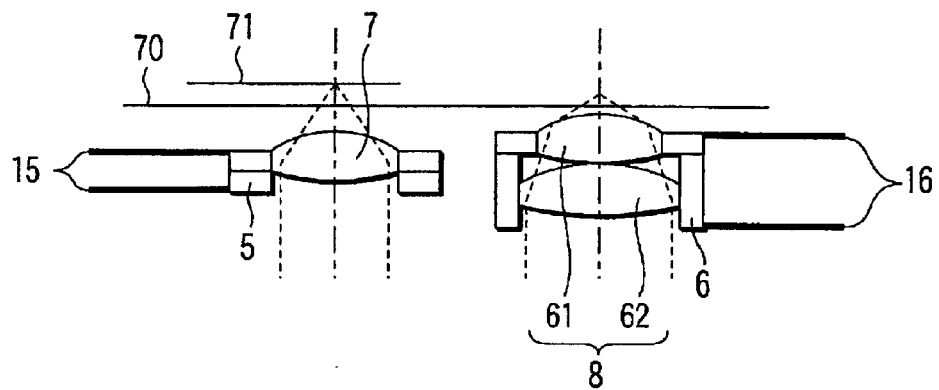
F I G. 15
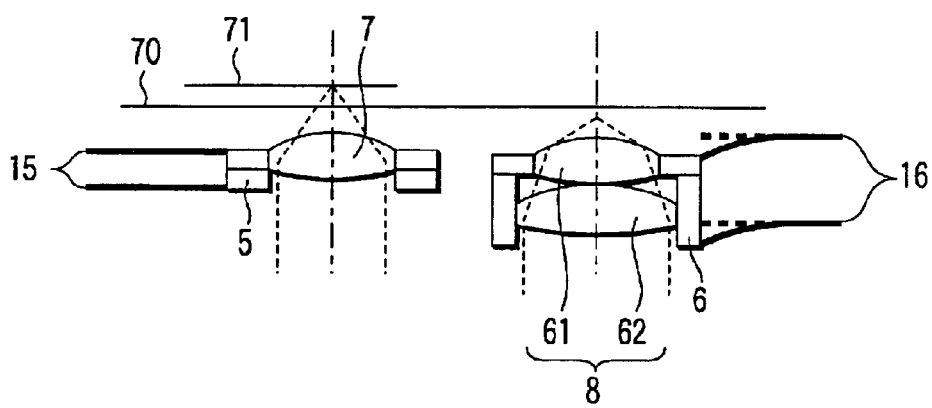
F I G. 16
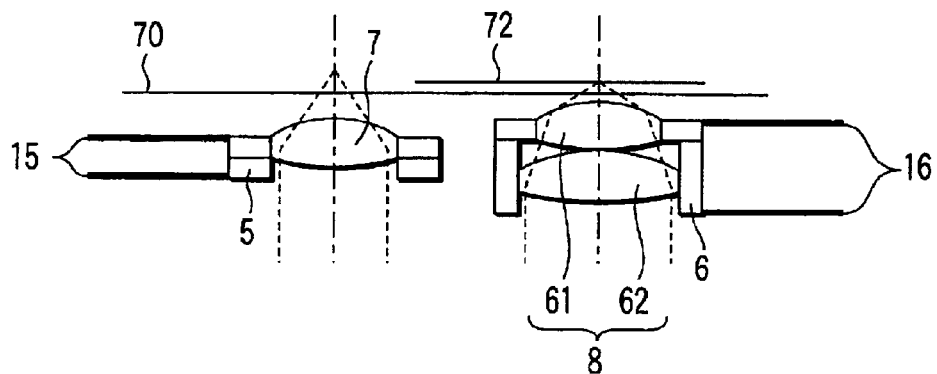
F I G. 17

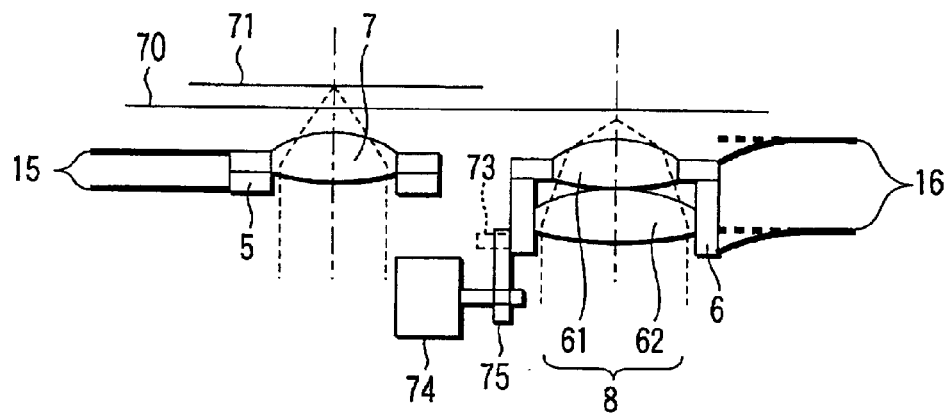
F I G. 18
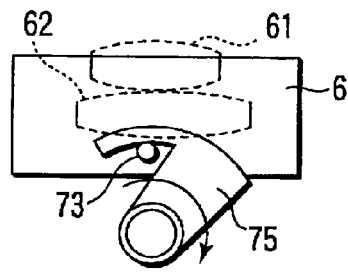
F I G. 19
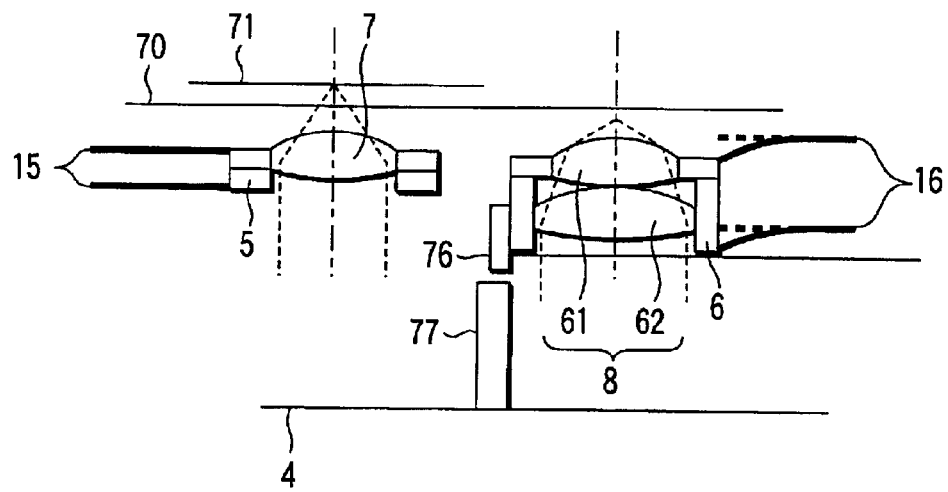
F I G. 20

OPTICAL DISK APPARATUS AND OPTICAL DISK PROCESSING METHOD

CROSS-REFERENCE TO RELATED APPLICATIONS

This application is based upon and claims the benefit of priority from the prior Japanese Patent Application No. 2001-126115, filed Apr. 24, 2001, the entire contents of which are incorporated herein by reference.

BACKGROUND OF THE INVENTION

The present invention relates to an optical disk apparatus for recording information on or reproducing information from an information recording track of an optical disk by irradiating the optical disk with a light beam. More particularly, the present invention relates to focus error detection of a light beam in this optical disk apparatus. Also, the present invention relates to an optical disk processing method.

In recent years, various studies and developments have been made for the purpose of improving the recording density of an optical disk. In an optical disk apparatus, an attempt is made to reduce the spot size of an optical spot by increasing the optical NA (Numerical Aperture) or adopting a short-wavelength laser. When the optical NA is increased, problems of stricter specifications of the tilt of an objective lens and a short distance between the objective lens and optical disk surface are pointed out.

As is well known, the specifications of the tilt of the objective lens can be relaxed by decreasing the distance from the optical disk surface (light entrance surface) to the recording surface, i.e., the thickness of a substrate. A sample optical disk having a shorter distance than the existing DVD or the like (which has a substrate having a thickness of about 0.6 mm), e.g., adopting a substrate having a thickness of about 0.1 mm has been prepared.

On the other hand, a high NA also leads to a decrease in distance between the objective lens and information recording surface. The distance between the objective lens and optical disk in the existing DVD is 1 mm or more. However, when an NA higher than 0.8 is adopted, the objective and optical disk adjoin at a distance less than 0.2 mm. When the objective lens and optical disk adjoin via such a short distance, the most serious problem is a collision of the objective lens against the optical disk. Such collision takes place when focus control runs away upon a focus lead-in operation or upon mixing of any disturbance in light reflected by the optical disk due to the influence of scratches, fingerprints, and the like on the optical disk. Hence, a stable focus lead-in operation and a focus control system which has high resistance against the influence of scratches, fingerprints, and the like are demanded.

As a conventional method of avoiding such collision, a method of forming an arcuated pattern on the objective lens on the optical disk surface side is proposed (Jpn. Pat. Appln. KOKAI Publication No. 2000-20985). The objective lens with such a structure exploits the generation of a floating force with respect to the optical disk due to the air flow generated in the gap between the optical disk and objective lens upon rotation of the optical disk. The objective lens is passively aligned to a position where the floating force and the driving direction in the focus direction balance. However, in this method, since the floating force of the objective lens with respect to the optical disk changes depending on the rotational speed of the disk, the floating amount readily changes due to the influences of disk rotation variations. When the rotational speed of the disk is not constant, the objective lens becomes unstable in this control method.

In order to attain adequate focus control, servo control of a conventional optical disk apparatus, which uses a focus error signal of a focus system is preferable. For example, Jpn. Pat. Appln. KOKAI Publication No. 2000-011401 proposes a method of realizing stable focus lead-in operation by adding signals from focus error detection systems having two different focus detection ranges. According to this method, a stable focus lead-in operation is realized by adding a focus error signal obtained by a detection optical system that can assure a broad focus error detection range, and a focus error signal obtained by a detection system which has a narrow focus error detection range but can assure high detection sensitivity. At the same time, precise focus alignment is realized. However, when scratches, dust, fingerprints, and the like become attached to the disk surface, the amplitude of the focus error signal itself used as a servo signal becomes small, the signal is susceptible to disturbances, and so forth. Furthermore, when the NA is high, since the spot size on the disk surface becomes small, the signal is readily influenced by disturbances, and the focus servo consequently runs away. Such an unstable state similarly occurs even in a focus lead-in operation, thus disturbing a stable focus lead-in operation. That is, since two different focus errors are generated using return light from a single optical spot formed on the information recording surface of the optical disk, an unstable state of the optical spot formed by a high-NA optical system cannot be avoided. As a result, the conventional servo control is vulnerable to disturbances that depend on the surface state of the optical disk such as scratches, dust, fingerprints, and the like, and the focus servo readily runs away due to the influences of disturbances.

Once the servo runs away, the objective lens may collide against the disk to damage not only the optical disk but also the objective lens, and information recording/reproduction may be disabled. In this way, the factors necessary for realizing an optical disk apparatus compatible with high-density optical disks are to realize a focus error detection system with which a focus servo hardly runs away even under the influence of scratches, dust, fingerprints, and the like, and a focus error detection system which hardly collides against the disk, and to realize a stable focus lead-in operation at the same time.

As described above, when the conventional focus error detection circuit is applied to a high-NA optical system, the objective lens is highly likely to collide against the disk. Also, the focus servo itself inevitably runs away due to the influence of scratches, dust, and fingerprints attached to the disk. When the focus servo runs away, since the distance between the objective lens and disk is small, the objective lens collides against the optical disk.

Furthermore, in the case of a high-density optical disk having a two-layered information recording surface, a focus error detection range is inevitably narrowed down. For this reason, focus control performance deteriorates. When focus control fails, the objective lens inevitably collides against the optical disk. For this reason, it is indispensable to realize a stable focus lead-in operation.

Moreover, in an optical disk having a thin substrate, since individual optical disks have different substrate thicknesses, substrate thickness variation correction such as spherical aberration correction or the like must be performed. Hence, a control system which executes focus control while making spherical aberration correction that influences focus control must be realized.

BRIEF SUMMARY OF THE INVENTION

The present invention has been made in consideration of the above situation, and has as its object to provide the following optical disk apparatus and optical disk processing method:

(1) an optical disk apparatus which can realize stable focus control and focus lead-in operation even when a high-NA optical system is used; and (2) an optical disk processing method which can realize stable focus control and focus lead-in operation even when a high-NA optical system is used.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a schematic block diagram (part 2) showing the arrangement of principal parts of the fine adjustment focus system of the optical disk apparatus according to the first embodiment of the present invention;

FIG. 8 is a schematic block diagram showing the arrangement of principal parts of a focus error detection system of an optical disk apparatus according to the second embodiment of the present invention;

FIG. 11 is a graph showing an example of a computed focus error signal;

FIG. 12 is a chart showing an example of a computed focus error signal;

FIG. 13 is a view for explaining a focus error detection method;

FIG. 15 is a view for explaining a case wherein a second actuator does not retract upon recording/reproduction by a first optical system;

FIG. 16 is a view for explaining a case wherein the second actuator has retracted upon recording/reproduction by the first optical system;

FIG. 17 is a view showing the recording/reproduction state by a second optical system;

FIG. 18 is a view showing a state wherein the second actuator is mechanically restrained;

FIG. 19 is an enlarged view showing the state wherein the second actuator is mechanically restrained; and FIG. 20 is a view showing a state wherein the second actuator is electromagnetically restrained.

DETAILED DESCRIPTION OF THE INVENTION

The first embodiment of the present invention will be described below with reference to the accompanying drawings.

[First Embodiment]

Two objective lens actuators are provided, and focus lead-in control is performed by learning the surface run-out.

Figure 1:
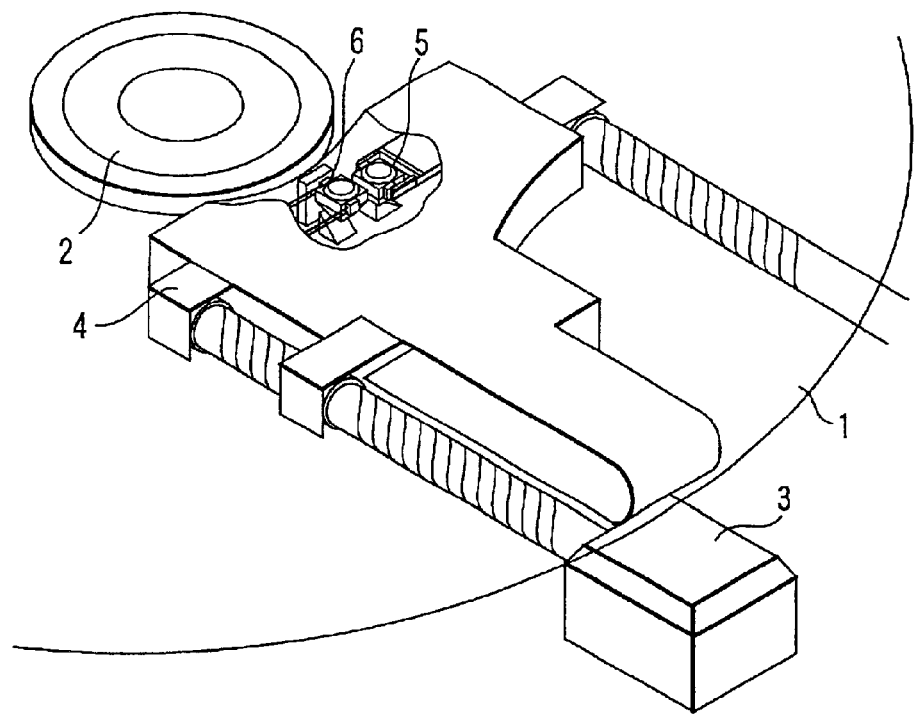
FIG. 1 is a perspective view showing the structure around an objective lens actuator of an optical disk apparatus according to the first embodiment of the present invention.
Figure 2:
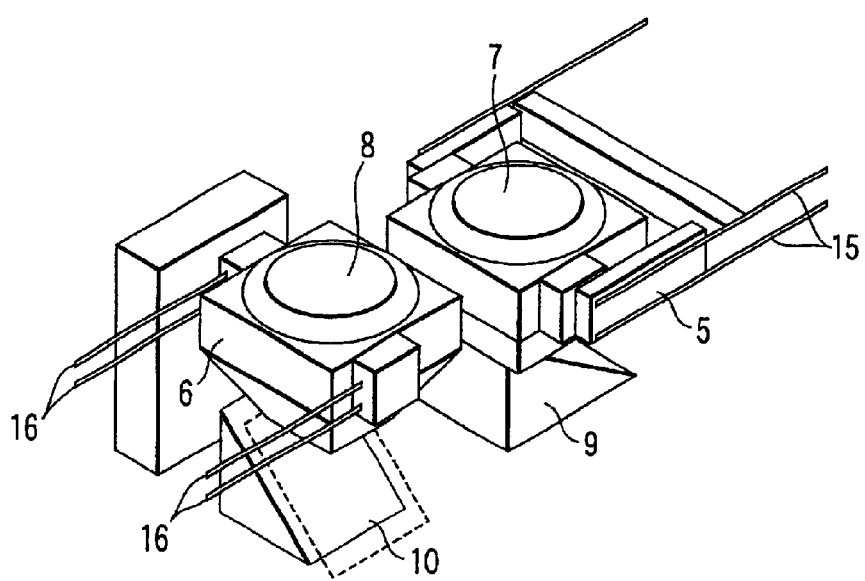
FIG. 2 is an enlarged view of the structure around the objective lens actuator of the optical disk apparatus according to the first embodiment of the present invention.

FIG. 1 is a perspective view showing the structure of an optical disk apparatus having a focus error detection circuit according to the present invention. FIG. 2 is an enlarged view of the structure around an objective lens actuator. This structure has two different optical systems, and an optical head has two objective lenses and actuators, so that information can be reproduced from or recorded on a predetermined optical disk using a low-NA optical system, and information can be reproduced from or recorded on another predetermined optical disk using a high-NA optical system.

An optical disk 1 having an information recording surface is attached to a spindle motor 2, and its rotation is controlled. An optical head for reproducing/recording information by forming an optical spot on the information recording surface of the optical disk 1 is supported to be movable in the radial direction of the optical disk, and is aligned in the radial direction by a feed motor such as a stepping motor 3 or the like. Two objective lens actuators 5 and 6 are mounted on a carriage 4 on which the optical head is mounted, and precisely align an optical spot with respect to an information recording track formed on the information recording surface in two directions, i.e., a focus direction as a direction perpendicular to the disk, and a track direction as a direction crossing the track. Of the two objective lens actuators, the first objective lens actuator 5 is provided for a low-NA optical system, and forms an optical spot on the information recording surface of an optical disk via a first objective lens 7 upon receiving a laser beam having a wavelength ranging from, e.g., 650 nm to 780 nm. The first objective lens actuator 5 is supported by a first objective lens support wire 15. On the other hand, the second objective lens actuator 6 is provided for a high-NA optical system, and forms an optical spot on the information recording surface of an optical disk via a second objective lens 8 upon receiving a laser beam having, e.g., a wavelength of around 400 nm. The second objective lens actuator 6 is supported by a second objective lens support wire 16. Note that an optical disk used upon forming an optical spot via the first objective lens, and an optical disk used upon forming an optical spot via the second objective lens have different physical properties. That is, an optical disk from/on which information is recorded/reproduced using a first optical system allows information recording/reproduction using a laser beam having a wavelength ranging from 650 nm to 780 nm, and is used for reproduction of a CD or DVD or recording/reproduction of a DVD-RAM or DVD-R or DVD-RW. On the other hand, an optical disk from/on which information is recorded/reproduced using a second optical system allows information recording/reproduction using a laser beam having a wavelength of around 400 nm, and has a surface recording density higher than a DVD or the like. In addition, the size of the optical spot formed on the information recording surface in this case is smaller than that formed by the first optical system. The first and second optical systems are selectively used to reproduce/record information from/on these two or more different optical disks using a plurality of laser beams having different wavelengths.

Figure 3:
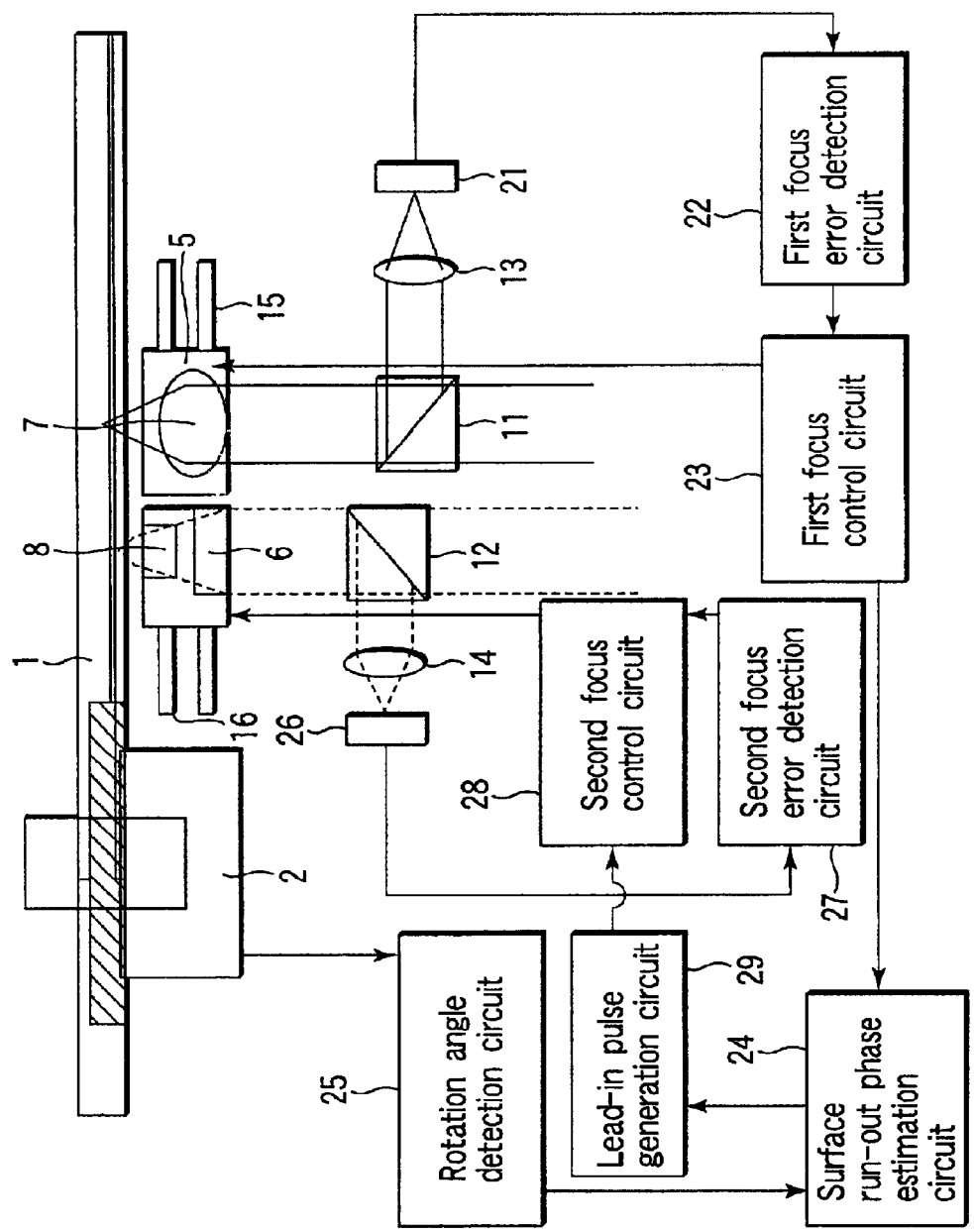
FIG. 3 is a schematic block diagram showing the arrangement of principal parts associated with focus control of the optical disk apparatus according to the first embodiment of the present invention.
Figure 6:
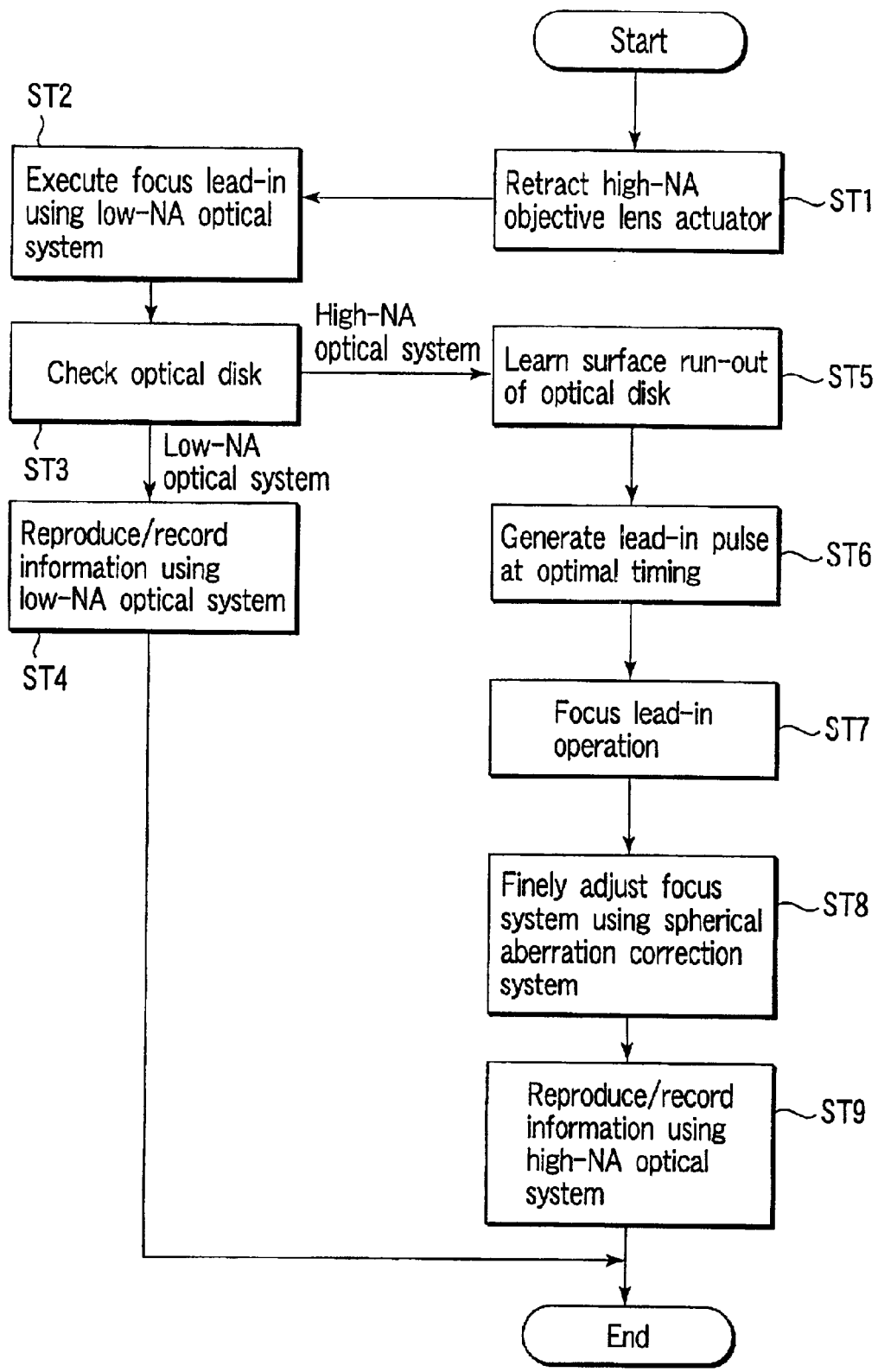
FIG. 6 is a flow chart showing the reproduction and recording processes using objective lenses having different NAs of the optical disk apparatus according to the first embodiment of the present invention.

The focus lead-in method and focus control method in the optical disk apparatus with this structure and, more particularly, the focus control method for an optical disk compatible with the second optical system with high NA will be described below with reference to the block diagram in FIG. 3 that shows principal parts for focus control, and the flow chart in FIG. 6.

Disk discrimination is done first (ST3). That is, it is checked if the optical disk 1 attached to the spindle motor 2 is an optical disk that allows information recording/reproduction using the first optical system or an optical disk that allows information recording/reproduction using the second optical system. The disk discrimination starts with focus control by the first optical system that uses the low-NA first objective lens (ST2). Light reflected by the optical disk enters a first PD (Photo Detector) 21 via a beam splitter 11 and focusing lens 13. Alternatively, that reflected light enters a second PD 26 via a beam splitter 12 and focusing lens 14. That is, sequentially voltage varying a kick pulse for focus lead-in is input to the first objective lens actuator while using a focus error signal detected by the first PD 21 for focus error detection arranged in the first optical system. FIG. 13 shows an astigmatism detection system as a general focus error signal generation system. In FIG. 13, a value given by (A+C)−(B+D) of a 4-split PD is a focus error amount. At this time, the second objective lens actuator 6 is preferably displaced and restrained in a direction away from the optical disk to avoid collision against the target optical disk surface (ST1). In the aforementioned operation sequence, the first objective lens actuator 5 undergoes focus control with respect to the optical disk 1 by a first focus control circuit 23 using a focus error signal detected by a low-NA first focus error detection circuit 22. This operation is executed in correspondence with the number of laser light sources of the first optical system in descending order of wavelengths. For example, focus control is executed using an incoming laser beam of 780 nm, and the next focus control is executed using an incoming laser beam of 650 nm. After focus control attempts using laser beams of all the wavelengths of the first optical system are made, if an information signal can be reproduced, or a reproduction signal is a desired signal, it is determined that the target optical disk is the one compatible with the first optical system (ST3). In this case, an information recording/reproduction process using the first optical system is executed (ST4).

After focus control attempts using laser beams of all the wavelengths of the first optical system are made, if an information signal cannot be reproduced or a reproduction signal is not a desired signal, it is determined that the target optical disk is not an optical disk compatible with the first optical system but an optical disk compatible with the second optical system (ST3), and an optical system switch operation is executed.

Prior to the switch operation, surface run-out of the target optical disk is learned using a control signal upon focus control of the first objective lens actuator 5 (ST5). This control signal can use a laser beam of any wavelength of the first optical system, but preferably uses a laser beam of the longest wavelength, e.g., a laser beam of a wavelength of, e.g., 780 nm. In the learning operation, a control signal of the actuator, which is output in accordance with surface run-out, is stored by a surface run-out phase estimation circuit in synchronism with the rotation angle information of the spindle motor. The first and second objective lens actuators generally undergo electromagnetic drive control. The control signal of such an electromagnetically driven actuator is supplied as an acceleration signal of the actuator. When the actuator is driven to track surface run-out as a disturbance factor of a low frequency such as a disk rotation frequency, the drive signal can be processed as a signal which changes nearly in phase with the position signal. Especially, the focus lead-in operation is performed on the disk inner peripheral portion where an expected surface run-out disturbance is small, i.e., a region where the rotation frequency for rotating the disk is relatively high (around 40 Hz). It is not basically difficult to estimate the surface run-out phase in this frequency domain. For example, the deviation of the actuator is estimated from the drive signal based on the known dynamic characteristic response model of the actuator, and the surface run-out phase is estimated since it is equivalent to the surface run-out deviation.

Figure 4:
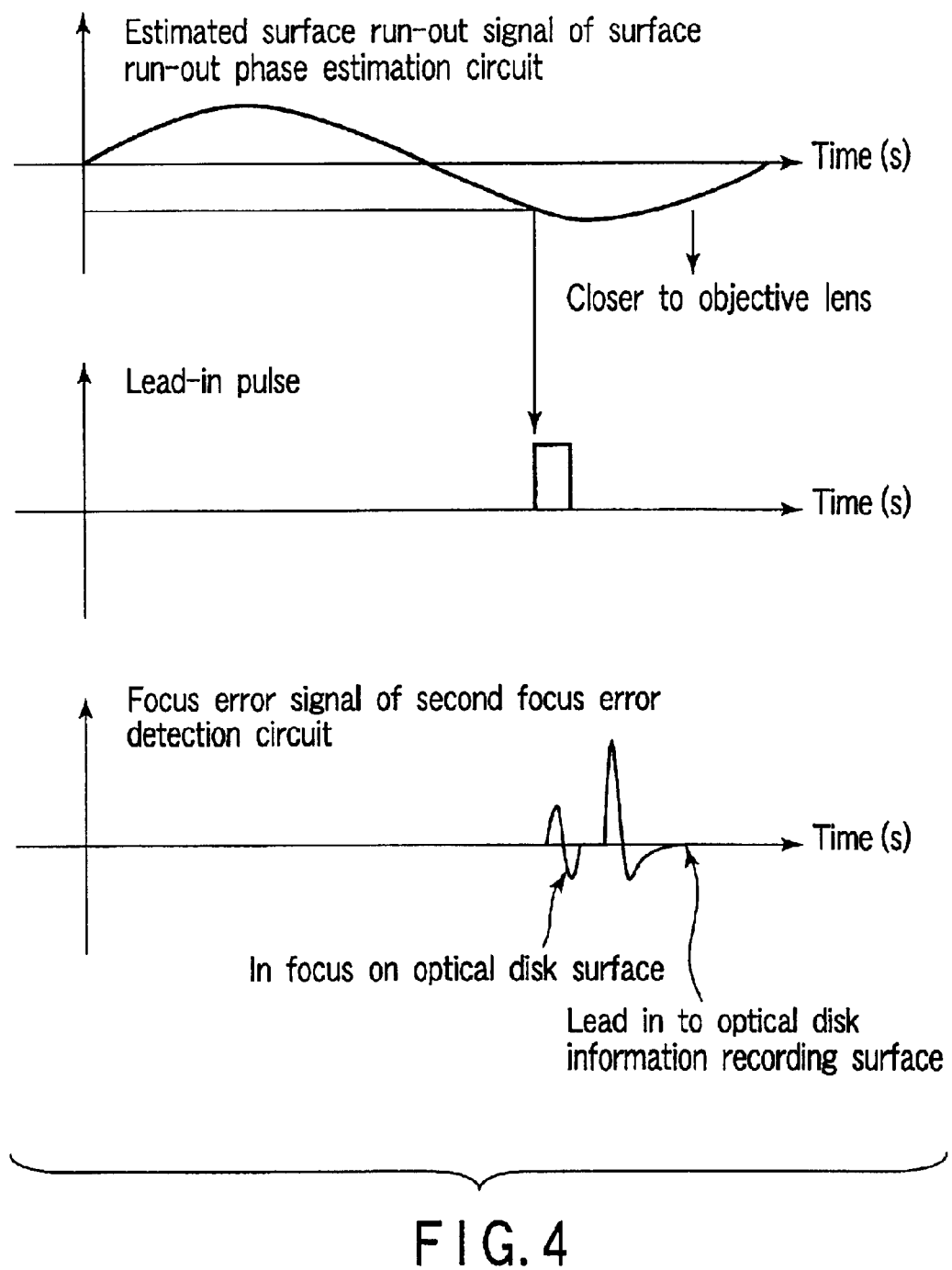
FIG. 4 is a chart for explaining signals upon focus lead-in control of the optical disk apparatus according to the first embodiment of the present invention.
Figure 14:
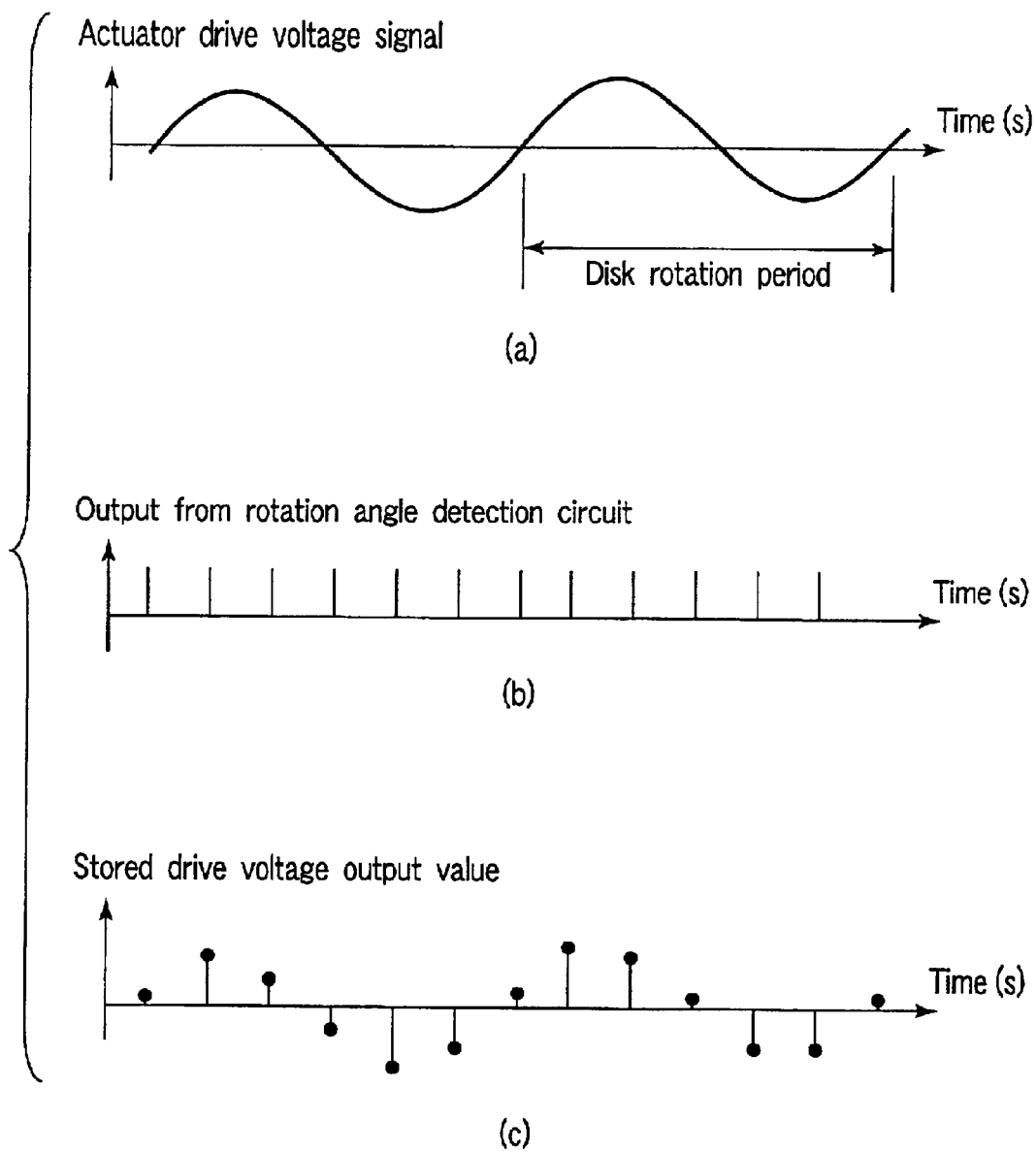
FIG. 14 is a view for explaining the storage operation for synchronously storing rotation angle information from a rotation angle detection circuit of a spindle motor, and the control output of a first focus control circuit.

A surface run-out phase estimation circuit 24 stores the rotation angle information from a spindle motor rotation angle detection circuit 25, and the control output of the first focus control circuit 23 in synchronism with each other. This storage operation will be explained below with reference to FIG. 14. The rotation angle detection circuit 25 can detect rotation angle information, and every angle obtained by dividing 360° into a plurality of angular ranges. For example, when the circuit 25 detects rotation angle information every 60°, the focus control output is sampled in synchronism with the rotation angle information every 60° and, for example, a voltage output value is stored as a sample value shown in FIG. 14. The stored voltage value is information which allows a rough estimation of the period and phase values of the drive signal by linear interpolation. After the surface run-out state is stored in synchronism with the rotation angle, the optical system is switched from the first optical system to the second optical system while controlling the rotation of the optical disk at an identical rotational speed. This switch operation is implemented by supplying a laser beam of a predetermined wavelength to the second objective lens actuator 6, and inputting a kick pulse control signal for focus lead-in to the second objective lens actuator 6 via a second focus control circuit 28 (ST6). This lead-in pulse is a drive signal for moving the second objective lens 8 toward the optical disk. Therefore, the objective lens actuator 6 moves toward the optical disk surface simultaneously with input of the kick pulse control signal. At the same time, the objective lens actuator 6 is controlled by the second focus control circuit 28 using a focus error signal which is detected by the second PD 26 provided in the second optical system and is computed by a second focus error detection circuit 27. When the objective lens 8 moves to a position where the second focus error detection circuit 27 can detect a focus error signal and the relative velocity between the objective lens 8 and the information recording surface of the optical disk 1 is smaller than a predetermined velocity, the focus lead-in operation succeeds (ST7). The surface run-out velocity is estimated from the surface run-out state estimated by the surface run-out phase estimation circuit 24, so that the relative velocity falls within the predetermined range, and lead-in control succeeds. Furthermore, a lead-in pulse generation circuit 29 superposes a kick pulse and brake pulse on the focus control signal at an optimal timing at which a velocity relative to the moving velocity of the objective lens becomes small. More specifically, such timing is preferably set near a region where the surface run-out amount is closest to the objective lens 8, since the surface run-out velocity of the optical disk is low, and the relative velocity with respect to the objective lens can be reduced. As described above, the lead-in operation is performed using the focus error signal of the second focus error detection circuit 27 provided in the second optical system. The relationship between the signal of the surface run-out phase estimation circuit, lead-in pulse, and focus error signal is as summarized in FIG. 4.

After the focus lead-in operation is performed in synchronism with the surface run-out phase, the second objective lens actuator 6 undergoes focus control with respect to the information recording surface of the optical disk. However, since the NA is high, the end face of the objective lens is aligned to a position 0.2 mm or less from the optical disk surface. After it is confirmed that an optical spot formed by the second objective lens 8 is in focus on the information recording surface of the optical disk, a fine adjustment operation of a spherical aberration correction system provided in the second optical system starts (ST8). The fine adjustment operation will be explained below using FIG. 5 as a block diagram that shows principal parts of a focus fine adjustment system.

Figure 5:
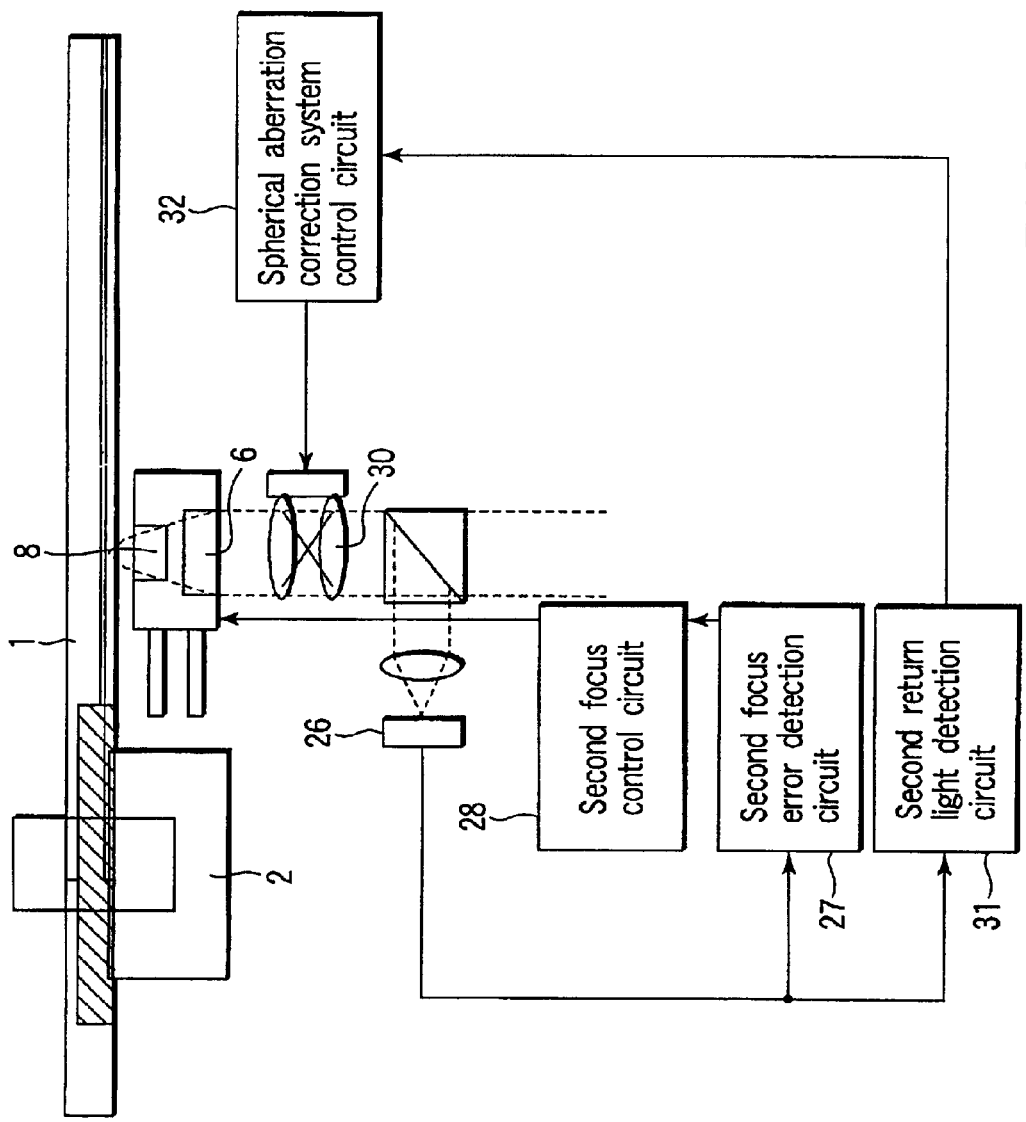
FIG. 5 is a schematic block diagram (part 1) showing the arrangement of principal parts of a fine adjustment focus system of the optical disk apparatus according to the first embodiment of the present invention.

A spherical aberration correction system 30 shown in FIG. 5 comprises, e.g., relay lenses and the like, and adjusts the laser beam size or the spread angle of the laser beam that enters the objective lens by controlling, e.g., the distance between two lenses. That is, this system consequently corrects any spherical aberration of an optical spot. In the high-NA second optical system, the thickness from the optical disk surface to the information recording surface is around 0.1 mm, and individual optical disks suffer thickness nonuniformity. To correct the thickness nonuniformity, such a spherical aberration correction system is often adopted. The spherical aberration correction system 30 provided for this purpose is preferably adjusted by a spherical aberration correction control circuit 32 to maximize the return light amount, while a second return light detection circuit 31 detects the sum total of return light amounts from the optical disk detected by the second PD 26 in a state wherein the second objective lens actuator undergoes focus control. This process is performed in consideration of the fact that the return light increases when the spherical aberration of the optical spot formed on the information recording surface is corrected. With this arrangement, a high-quality optical spot can be obtained.

In this way, the focus lead-in operation of the second optical system is completed. Upon completion of the focus lead-in operation, predetermined information recorded on the optical disk is read and reproduced to confirm if the target optical disk is compatible with the high-NA optical system, and a desired information signal is recorded or reproduced (ST9).

Note that surface run-out learning in the aforementioned operation may be performed using another optical system in place of the first optical system. In the surface run-out learning step (ST5) and the lead-in step (ST6) at the optimal timing, the first optical system need not be switched to the second optical system, and the focus lead-in operation of the second objective lens actuator may be realized while the first objective lens actuator of the first optical system undergoes focus servo control to information recording surface run-out. In such a case, the disk need not be controlled at the same rotational speed as that upon surface run-out learning, and may be rotated at an arbitrary rotational speed.

In the lead-in sequence, the lead-in pulse may be a gradually varying signal. Then the lead-in signal may control the objective lens actuator firstly to retract away from the surface of the optical disk, and gradually to approach onto the surface of the optical disk.

In the first optical system, a plurality of laser beams enter a single objective lens. Alternatively, the first optical system may comprise, e.g., a single objective lens actuator having two objective lenses, two laser light sources, and a focus error detection circuit corresponding to the two laser light sources. More specifically, the first optical system may comprise a first objective lens actuator that holds an objective lens corresponding to a wavelength of 780 nm, and an objective lens corresponding to a wavelength of 650 nm, laser beams of the two wavelengths, and a detection system.

While the first optical system performs surface run-out learning, the second objective lens actuator is preferably restrained at a position away from the optical disk surface. The positional relationship between the first and second objective lens actuators will be explained below with reference to FIGS. 15 to 20. If the second objective lens actuator is not retracted and restrained while the focus servo is activated by the low-NA first objective lens actuator, the positional relationship between the first and second objective lens actuators upon recording/reproduction using the first optical system is as shown in FIG. 15. That is, the first objective lens actuator is driven to be in good focus with an information recording surface 71 of the optical disk. At this time, if a surface 70 of the optical disk suffers surface run-out, it may collide against the second objective lens. To avoid the collision, the second objective lens actuator is retracted and is restrained at that position, as shown in FIG. 16. Upon recording/reproduction using the second optical system, the positional relationship between the first and second objective lens actuators is as shown in FIG. 17. The restraint described in FIG. 16 may be attained by providing a mechanical projection 73 to an objective lens holding member, and by restraining the projection 73 by a rotary member 75 attached to the distal end of a motor 74, as shown in FIGS. 18 and 19. Also, an electromagnetic coil 76 provided in the second objective lens actuator may be electromagnetically restrained by a projection 77 of the carriage 4, as shown in FIG. 20. Under such restraint, the lead-in operation may be realized by the resilience of a support spring upon releasing from the restraint without using any drive control signal based on a lead-in pulse. For example, when the objective lens actuator is held by electromagnetic restraint in a direction farther away from the optical disk surface than a mechanical neutral position, the objective lens actuator 6 moves by the resilience toward the optical disk surface simultaneously with release. The lead-in operation may be attained by this moving velocity.

In the above arrangement, the focus lead-in operation is not performed at an in-focus point with respect to the optical disk surface but is performed with respect to only the information recording surface. Such a lead-in operation is realized by, e.g., a counter so as to lead the objective lens to the second change position of an error signal while observing a focus error signal. However, since the operation of such a counter is often unstable, focus control may be executed for the optical disk surface using a focus error signal observed with respect to the optical disk surface, and the focus lead-in operation may be performed with respect to the information recording layer by focus jump. Likewise, in the case of an optical disk having a plurality of information recording layers, after the focus lead-in operation is made for the front information recording layer, focus jump is preferably made in turn to the next layer. The focus lead-in operation may be performed by selecting a target information recording layer by the counter operation. However, in consideration of stability of the counter operation, a reliable focus lead-in operation can be achieved by executing the lead-in operation with respect to the front layer which allows the lead-in operation.

In a focus system fine adjustment using the spherical aberration correction system, the spherical aberration correction system 30 may be adjusted to reduce a DC component while observing the DC component of the focus control signal of the second focus control circuit 23, as shown in FIG. 7. At the same time, the return light amount may be detected to correct any spherical aberrations to an optimal position.

The second embodiment of the present invention will be described below with reference to the accompanying drawings.

[Second Embodiment]

A focus error detection optical system generates and mixes two focus errors.

FIG. 8 is a block diagram showing the arrangement of an optical disk apparatus having a focus error detection circuit of the present invention. Since the arrangement of the low-NA first optical system and the like is the same as that of the first embodiment, FIG. 8 shows the arrangement of only the high-NA second optical system.

Figure 9:
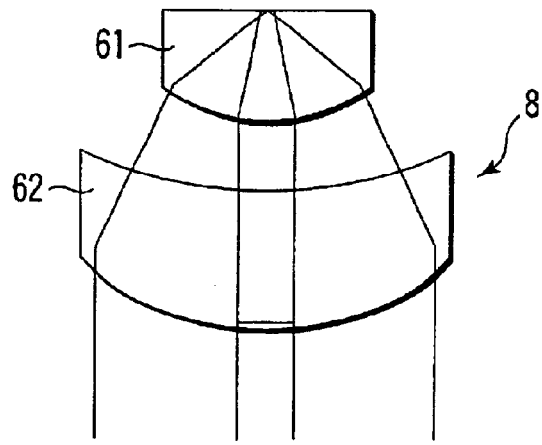
FIG. 9 is a view showing the structure of an objective lens of a high-NA optical system of the optical disk apparatus according to the second embodiment of the present invention.

In this arrangement, a phase converter 51 having a function of shifting about ¼λ (wavelength) only the transfer phase around the optical axis center is inserted in the optical path of the high-NA optical system. Some light components of light that enter the second objective lens 8, especially, light components near the optical axis center are not focused by a first component lens 62 that forms the second objective lens, but are focused by only a second component lens 61, forming a spot on the information recording surface in the optical disk. FIG. 9 shows the structure of such a second objective lens 8. Light components near the optical axis center, which are focused by only the second component lens 61, form an optical spot with a large spot size on the information recording surface due to the low NA. Also, light beam components slightly outside the optical axis center, which do not undergo wavelength shift by the phase converter, are focused with the high NA by the first and second component lenses, thus forming a spot on the information recording surface in the optical disk. This spot size is small since the NA is high. The respective incoming light components are split by a polarization beam splitter 52 after they are reflected by the information recording surface. The light beam components around the optical axis center enter a third PD 64 via a focusing lens 53, and are detected as a third focus error signal by a third focus error detection circuit 55. On the other hand, the light beam components slightly away from the optical axis center enter the second PD 26 via the beam splitter 12 and the focusing lens 14. A second focus error detection circuit 56 detects a second focus error signal on the basis of the light intensity detected by the PD 26. The second and third focus error signals are input to a second focus error arithmetic circuit 57 and undergo addition/subtraction. The calculated focus error signal is used to drive the second objective lens actuator 6 by the second focus control circuit.

Figure 10:
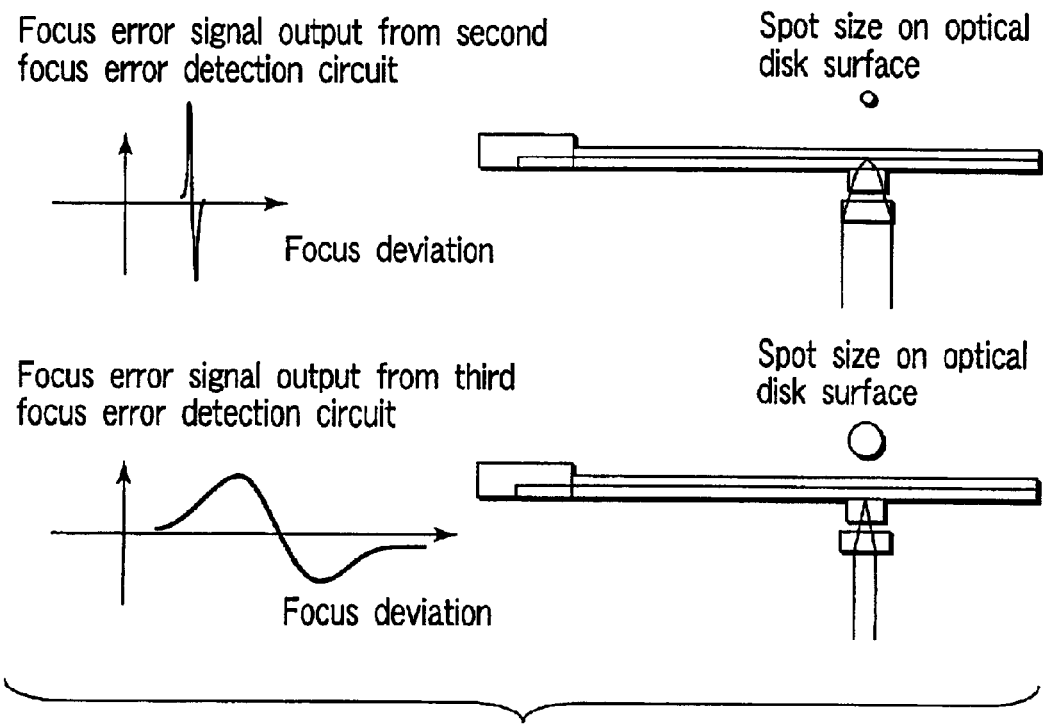
FIG. 10 is a view showing signals of focus error detection systems of the optical disk apparatus according to the second embodiment of the present invention.

The arithmetic operation made by the second focus error arithmetic circuit 57 at that time will be described below with reference to FIG. 10. The second focus error detection circuit 56 detects a focus error signal with respect to the information recording surface of the optical disk using a small optical spot formed with high NA. For this reason, the deviation range having the sensitivity of the focus error signal is narrow, and the spot size on the optical disk surface decreases. On the other hand, the third focus error detection circuit 55 detects a focus error signal with respect to the information recording surface of the optical disk using a relatively large optical spot formed with low NA. For this reason, a relatively broad deviation range having the sensitivity of the focus error signal can be assured, and the spot size on the optical disk surface is large. These focus error signals having two different properties are, e.g., added to obtain a focus error signal for driving the second objective lens actuator 6.

The focus error signal calculated, as shown in FIG. 11, has properties of broadness in detection range of the third focus error signal and robustness against the influences of scratches and dust on the optical disk surface, and the second focus error signal has a high detection resolution that can assure accurate focus alignment. Let FE2 be the second focus error signal, and FE3 be the third focus error signal. Then, a calculated focus error signal FE-cal is given by:

$$FE\text{-}Ca1 = FE2 + \alpha \times FE3$$

where α is an arbitrary positive value. Since the focus error signal is calculated in this way, the focus lead-in operation can be stably performed using the properties of the third focus error signal, and focus alignment can be accurately performed owing to the properties of the second focus error signal. Even when the second focus error signal is disturbed by the influence of scratches, dust, and the like on the optical disk surface, the third focus error signal is robust against the disturbances, and can be detected. For this reason, although the alignment precision of focus control slightly deteriorates, a moderate focus control that tracks surface run-out of the optical disk can be implemented while preventing the objective lens from colliding against the optical disk due to being out of control.

Note that the third focus error detection circuit 55 with the above arrangement can slightly electrically offset the third focus error signal and can detect an in-focus point on the objective lens side in front of the information recording surface of the optical disk. In this case, the focus error signal calculated by the second focus error arithmetic circuit 57 can be formed to have a plurality of focal point positions, as shown in FIG. 12. In this case, after the focus lead-in operation is made with respect to the front in-focus position, focus jump is made to the back in-focus position as that of the second focus error detection system, thus achieving accurate focus alignment to the target information recording surface. At the same time, with this arrangement, even when the focus error signal of the second focus error detection system cannot be detected due to the state of the optical disk surface, the objective lens moderately moves away from the optical disk surface and undergoes focus control with respect to the front in-focus position, thus avoiding collision of the objective lens.

The aforementioned arrangement is also effective when focus control is made for an optical disk having a plurality of information recording layers. When an optical disk which allows information recording/reproduction using the high-NA optical system has a plurality of information recording layers, the interlayer distance between neighboring information recording layers must be small. More specifically, the distance is preferably 30 μm to 50 μm. This is because a reflection film of the back layer is formed by a metal film such as aluminum, and a stable focus error signal is expected even when the NA is low. However, with this arrangement, since focus error detection of a first information recording layer, which is formed in front of the objective lens, and that for a second information recording layer, which is formed behind the objective lens must be processed not to interfere with each other, the respective focus error detection ranges become very narrow. More specifically, an error detection system within the range of about ±3 μm is formed. In such case, the second focus error arithmetic circuit can calculate a focus error signal that can implement stable focus control, on the basis of the third focus error signal detected by the third focus error detection circuit and the second focus error signal detected by the second focus error detection circuit. At this time, the third focus error detection circuit preferably detects the focus error signal using return light especially from the back information recording layer.

In the above arrangement, since the focus control lead-in operation, fine adjustment operation, and jump operation are the same as those in the first embodiment, a description thereof will be omitted.

In the above arrangement, since the focus lead-in control can be stably performed due to the properties of the third focus error signal, surface run-out learning using the low-NA first optical system need not be performed.

As described above, according to the present invention, the following effects can be obtained.

When low- and high-NA optical systems are present and respectively have different objective lens actuators, a first objective lens actuator that holds a first objective lens of the low-NA optical system executes focus control first to learn the surface run-out amount of the target optical disk. After that, if it is determined that the target optical disk is compatible with information recording/reproduction using the high-NA optical system, a second objective lens actuator that holds a second objective lens of the high-NA optical system executes the focus lead-in operation at an optimal timing with reference to the learned surface run-out phase, thus stably switching the focus control.

Even in the high-NA optical system, low-NA focus error detection is made using light components around the optical axis center, and a signal obtained by adding two focus error signals obtained by high- and low-NA focus error detection systems is used as a focus error signal for focus alignment of an objective lens. With this arrangement, an in-focus point of the low-NA focus error detection system is formed slightly on the disk surface side compared to that of the high-NA focus error detection system, and a drive force that becomes a large repulsion force can be generated upon defocusing the objective lens in a direction to collide against the disk. Furthermore, with this arrangement, since the low-NA focus error detection system can form a larger spot on the disk surface than the high-NA focus error detection system, a focus error signal robust against the influence of dust or scratches on the disk surface can be obtained. For this reason, even when a signal from the high-NA focus error detection system decreases due to the influence of scratches and dust, the objective lens can be prevented from colliding against the disk due to runaway of the focus servo, and servo control is made in a direction away from the disk.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. An optical disk apparatus comprising:

a drive motor for rotating an optical disk;

rotation angle detection means for detecting a rotation angle of said drive motor;

a first objective lens;

a first objective lens holder which holds said first objective lens and is supported to be drivable in an optical axis direction of said first objective lens and in one direction perpendicular to the optical axis;

a first focusing actuator for driving said first objective lens holder in the optical axis direction;

first focus detection means for detecting a relative deviation between said first objective lens and an information recording surface of the optical disk in the optical axis direction, and adjusting a focus to the information recording surface;

first drive control means for controlling driving of said first focusing actuator on the basis of a detection result of said first focus detection means;

storage means for storing a drive control signal output from said first drive control means and a rotation angle detection signal detected by said rotation angle detection means in synchronism with each other as surface run-out of the optical disk;

a second objective lens having a focal length shorter than said first objective lens;

a second objective lens holder which holds said second objective lens and is supported to be drivable in an optical axis direction of said second objective lens and in one direction perpendicular to the optical axis;

a second focusing actuator for driving said second objective lens holder in the optical axis direction;

second focus detection means for detecting a relative deviation between said second objective lens and the information recording surface of the optical disk in the optical axis direction, and adjusting a focus to the information recording surface;

second drive control means for controlling driving of said second focusing actuator on the basis of a detection result of said second focus detection means; and optical disk process means for (i)executing a focus lead-in process by irradiating the rotating optical disk with a light beam applied via said first objective lens of a first optical system, said first objective lens having a first numerical aperture lower than a second numerical aperture of said second objective lens of a second optical system, while said second objective lens of the second optical system is retracted not less than a predetermined distance away from the optical disk, (ii) discriminating an optical system suitable for a recording/reproduction process of the optical disk, (iii) processing the optical disk, when the optical system suitable for the recording/reproduction process of the optical disk is the first optical system, by irradiating the optical disk with the light beam via said first objective lens of the first optical system without detecting a surface run-out of the optical disk from the reflected light of the light beam, (iv) and irradiating the optical disk with the light beam via said first objective lens of the first optical system, when the optical system suitable for the recording/reproduction process of the optical disk is the second optical system, detecting surface run-out of the optical disk, executing the focus lead-in process by irradiating the optical disk with the light beam via said second objective lens of the second optical system on the basis of a surface run-out learning result of the optical disk, and processing the optical disk by irradiating the optical disk with the light beam via said second objective lens of the second optical system.

2. An optical disk processing method comprising:

the first step of executing a focus lead-in process by irradiating a rotating predetermined optical disk with a light beam applied via a first objective lens of a first optical system, said first objective lens having a first numerical aperture lower than a second numerical aperture of a second objective lens of a second optical system;

the second step of discriminating an optical system suitable for a recording/reproduction process of the optical disk;

the third step of processing the optical disk, when the optical system suitable for the recording/reproduction process of the optical disk is the first optical system, by irradiating the optical disk with the light beam via the first objective lens of the first optical system without detecting a surface run-out of the optical disk from the reflected light of the light beam; and the fourth step of processing the optical disk, when the optical system suitable for the recording/reproduction process of the optical disk is the second optical system, by irradiating the optical disk with the light beam via the second objective lens of the second optical system, wherein the first step includes the fifth step of executing the focus lead-in process by irradiating the optical disk with the light beam via the first objective lens of the first optical system while the second objective lens of the second optical system is retracted not less than a predetermined distance away from the optical disk, wherein the fourth step includes the sixth step of irradiating the optical disk with the light beam via the first objective lens of the first optical system, and detecting surface run-out of the optical disk from the reflected light of the light beam, the seventh step of executing the focus lead-in process by irradiating the optical disk with the light beam via the second objective lens of the second optical system on the basis of a surface run-out learning result of the optical disk detected in the sixth step; and the eighth step of executing the recording/reproduction process on the optical disk by irradiating the optical disk with the light beam via the second objective lens of the second optical system.

* * * * *